(12) United States Patent
Chang et al.

(10) Patent No.: US 8,909,225 B2
(45) Date of Patent: Dec. 9, 2014

(54) MULTICARRIER WIRELESS SERVICE SELECTION

(75) Inventors: Patricia R. Chang, San Ramon, CA (US); Lalit R. Kotecha, San Ramon, CA (US); Benjamin J. Parker, Foster City, CA (US); David Chiang, Fremont, CA (US); Jack T. Tang, Danville, CA (US); James A. Wales, Santa Cruz, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/603,840

(22) Filed: Sep. 5, 2012

(65) Prior Publication Data

US 2014/0066005 A1 Mar. 6, 2014

(51) Int. Cl.
*H04W 4/00* (2009.01)
*H04M 11/00* (2006.01)
*H04W 24/00* (2009.01)

(52) U.S. Cl.
USPC ............... 455/435.2; 455/406; 455/432.1; 455/456.3

(58) Field of Classification Search
CPC ....... H04W 48/18; H04W 48/16; H04W 4/06; H04W 4/02; H04W 4/24; H04W 36/14; H04W 60/00; H04W 60/04; H04W 88/06; H04L 12/14; H04L 12/141; H04L 12/1453; H04L 12/1485; H04L 29/08657; H04M 17/00; H04M 15/00; H04M 15/41; H04M 15/67; H04M 15/80; H04M 14/42; H04M 2215/0152; H04M 2215/0164; H04M 2215/016; H04M 2215/018; H04M 2215/14; H04M 2215/20; H04M 2215/68; H04M 2215/44; H04M 2215/46
USPC .......................... 455/406, 415, 435.1–435.3, 455/432.1–432.3, 456.1, 456.3, 436, 414.1; 370/331; 379/114.01
See application file for complete search history.

(56) References Cited

U.S. PATENT DOCUMENTS

| | | | |
|---|---|---|---|
| 2010/0022241 A1* | 1/2010 | Hokao | 455/435.2 |
| 2010/0056102 A1* | 3/2010 | Chan et al. | 455/406 |
| 2010/0130177 A1* | 5/2010 | Ku et al. | 455/414.1 |
| 2010/0330986 A1* | 12/2010 | Rahman et al. | 455/432.1 |
| 2011/0055411 A1* | 3/2011 | Taaghol | 709/228 |
| 2012/0302218 A1* | 11/2012 | Tsuda et al. | 455/414.1 |

* cited by examiner

*Primary Examiner* — Michael Mapa

(57) ABSTRACT

A user equipment (UE) provides a device identifier to a server device, and receives, based on one of the device identifier or a location of the device, carrier pricing information from the server device. The UE provides the carrier pricing information for display, and receives a selection of a particular carrier from the displayed carrier pricing information. The UE provides an indication of the particular carrier to the server device, initializes a connection with the particular carrier, and performs one or more communication operations via the connection with the particular carrier.

21 Claims, 15 Drawing Sheets

MULTICARRIER WIRELESS SERVICE SELECTION

BACKGROUND

A prepaid mobile communication device (e.g., a user equipment (UE)) may be referred to as a pay-as-you-go mobile phone, a pay-as-you-talk mobile phone, a pay and go mobile phone, etc. A prepaid UE may include a device for which credit is purchased to use the UE in advance of service use. The purchased credit is used to pay for wireless services, from a particular carrier, when the services are accessed or consumed. If there is no available credit, then access to the requested service is denied by the particular carrier. Users of prepaid UEs may purchase the credit using a variety of payment mechanisms.

DETAILED DESCRIPTION OF PREFERRED EMBODIMENTS

The following detailed description refers to the accompanying drawings. The same reference numbers in different drawings may identify the same or similar elements.

Figure 1:
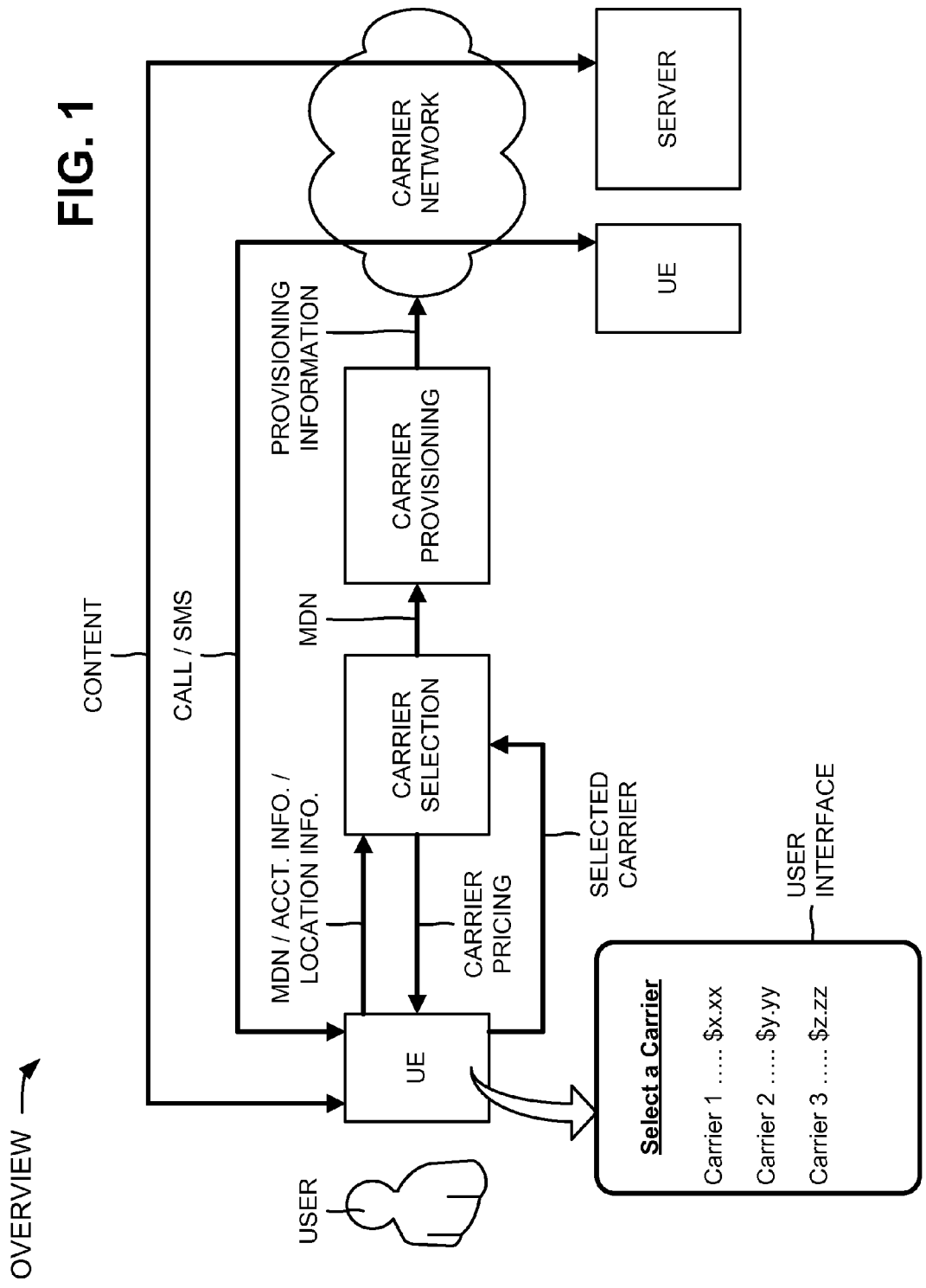
FIG. 1 is a diagram of an overview of an example implementation described herein.

Systems and/or methods described herein may enable a prepaid UE to select a wireless carrier from a list of wireless carriers that includes prices associated with the wireless carriers. The prepaid UE may pay the selected wireless carrier at the time of selection and may utilize wireless services provided by the selected wireless carrier. FIG. 1 is a diagram of an overview of an example implementation described herein. As shown, the overview may include two UEs, a carrier selection device, a carrier provisioning device, a carrier network, and a server device.

Each of the UEs may include a radiotelephone, a personal communications system (PCS) terminal, a smart phone, a personal digital assistant (PDA), or other types of mobile communication devices. The carrier selection device may include one or more computation and communication devices that may enable the UE to select a wireless carrier from a list of wireless carriers. The carrier provisioning device may include one or more computation and communication devices that may provision one or more UEs for using the carrier network. The carrier network may include a wireless access network (e.g., a Long Term Evolution (LTE) network, an evolved high rate packet data (eHRPD) network, etc.), and a core network that includes core network equipment, such as a packet data network (PDN) gateway (PGW), a serving gateway (SGW), a mobility management entity (MME), etc. The server device may include one or more computation and communication devices that may exchange content (e.g., audio, video, audio and video, applications, data, etc.) with the UE.

As further shown in FIG. 1, a user may utilize a first UE to input account information associated with the user. The account information may include a name of the user, a password associated with the user, billing information associated with the user (e.g., an account number, a credit card number, a billing address, etc. associated with the user), etc. The user may cause the first UE to send a device identifier (e.g., a mobile directory number (MDN), a mobile identification number (MIN), etc.) associated with the first UE, the account information, and location information to the carrier selection device. The location information may include a geographical location of the first UE, global positioning system (GPS) coordinates associated with the first UE, etc.

The carrier selection device may receive the device identifier, the account information, and the location information, and may determine carrier pricing information (e.g., different carrier prices) based on the device identifier, the account information, and/or the location information. For example, the carrier selection device may determine different carrier prices for the first UE based on the location of the first UE (e.g., a carrier located closer to the first UE may provide better prices than a carrier located further away from the first UE). Alternatively, or additionally, the carrier selection device may determine different carrier prices for the first UE based on the account information (e.g., a particular carrier may provide better prices for the first UE since the first UE may be prepaid for a particular plan, such as a third generation (3G) wireless plan). The carrier selection device may provide the carrier pricing information to the first UE.

The first UE may receive the carrier pricing information, and may display the carrier pricing information on a user interface associated with the first UE. For example, the user interface may display a carrier name and a carrier price (e.g., per use of carrier services, per outbound call, per inbound call, per short message service (SMS) message, per an amount of data received by the first UE, etc.). As shown in FIG. 1, the user interface may provide a list of three carriers (e.g., Carrier 1, Carrier 2, and Carrier 3) and prices associated with the three carriers (e.g., $x.xx, $y.yy, and $z.zz). In one example, the user interface may rank the three carriers in a particular order (e.g., with the least expensive carrier listed first and most expensive carrier listed last) or may not rank the three carriers in any particular order. Alternatively, or additionally, the user interface may display other information provided by the carrier selection device to the first UE. For example, the user interface may display information about services offered by different carriers (e.g., one carrier may be more expensive but may offer more services than a cheaper carrier), special offers available from the carriers, advertisements relating to particular carrier services, etc.

The user interface may instruct the user to select a carrier from the list, and the user may select one of the carriers from the list (e.g., using a touch screen display of the first UE). Based on the selection of the one carrier, the first UE may provide an indication of the selected carrier to the carrier selection device.

The carrier selection device may receive the indication of the selected carrier, and may provide the device identifier (e.g., the MDN) of the first UE to the carrier provisioning device based on the receipt of the indication. The carrier provisioning device may receive the device identifier, and may enable the first UE to be provisioned in the carrier network, based on the device identifier, by providing provisioning information to the carrier network. The provisioning information may include information about the first UE (e.g., the device identifier, the account information, etc.) that the carrier network may use to provision the first UE in the carrier network. The carrier network may provide the first UE with everything that is necessary to set up a service. The carrier network may activate the service for the first UE and may populate various network databases (e.g., an ENUM database, a local number portability (LNP) database, an authentication, authorization, and accounting (AAA) database, etc.) with the first UE information and/or information associated with the user (e.g., the MDN, the account information, etc.).

Once the first UE is provisioned for the selected carrier network, the user may cause the first UE to connect to the selected carrier network. In one example, the user may power the first UE on and off so that the first UE connects to the selected carrier network. Once the first UE is connected to the selected carrier network, the first UE may perform various communication operations via the carrier network. For example, as shown in FIG. 1, the first UE may place an outbound call to a second UE, or may receive an inbound call from the second UE, via the carrier network. Alternatively, or additionally, the first UE may exchange SMS messages with the second UE via the carrier network. Alternatively, or additionally, the first UE may exchange content (e.g., applications, data, etc.) with the server device via the carrier network.

In one example implementation, the user may select a default carrier network so that the user may receive advertisements and/or real time pricing information from the default carrier network. Once the user has selected a pricing plan and a carrier network, the first UE may send a signal to the carrier selection device. The signal may trigger the carrier selection device to provide a message to the carrier provisioning device. The carrier provisioning device may provide the MDN and other user information in the carrier network's database (e.g., the AAA, a home subscriber server (HSS), a home location register (HLR), etc.). The signal may also trigger the carrier selection device to provide a message, to the LNP database, informing the carrier network that the MDN has been assigned to the carrier network. In one example, all of these functions may be performed in real time. In other words, the user may utilize the MDN to sign up for and activate a service with a selected carrier network at any given time, at any location, and in real time. The user may change carrier networks in real time on a per call, per time period, per message, etc. basis.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
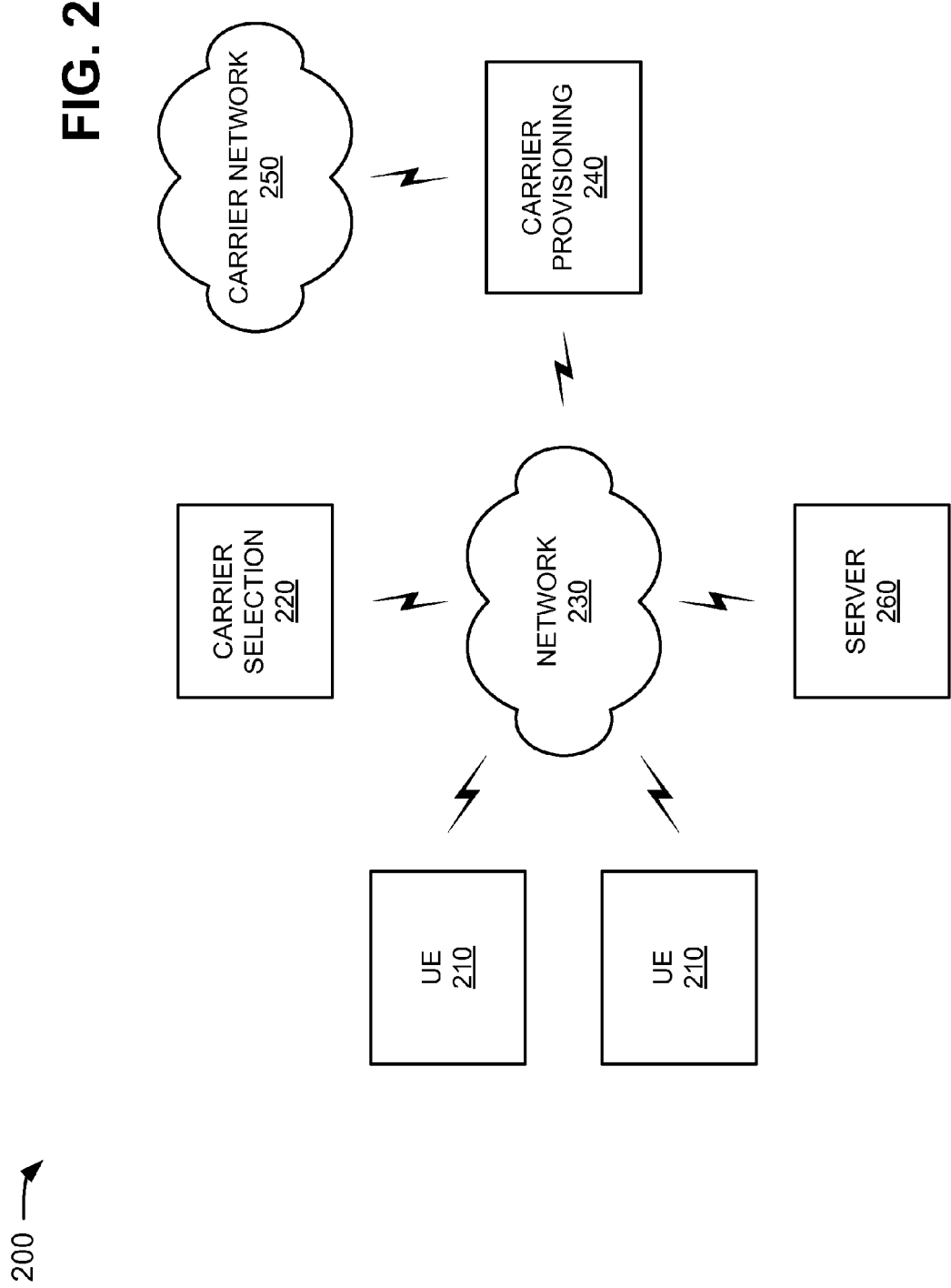
FIG. 2 is a diagram of an example environment in which systems and/or methods described herein may be implemented.

FIG. 2 is a diagram of an example environment 200 in which systems and/or methods described herein may be implemented. As illustrated, environment 200 may include UEs 210, a carrier selection device 220, a network 230, a carrier provisioning device 240, a carrier network 250, and a server device 260. Devices of environment 200 may interconnect via wired and/or wireless connections or links. Two UEs 210, a single carrier selection device 220, a single network 230, a single carrier provisioning device 240, a single carrier network 250, and a single server device 260 have been illustrated in FIG. 2 for simplicity. In practice, there may be more UEs 210, carrier selection devices 220, networks 230, carrier provisioning devices 240, carrier networks 250, and/or server devices 260.

UE 210 may include a radiotelephone, a PCS terminal (e.g., that may combine a cellular radiotelephone with data processing and data communications capabilities), a smart phone, a PDA (e.g., that can include a radiotelephone, a pager, Internet/intranet access, etc.), a laptop computer (e.g., with a broadband air card), a tablet computer, a machine-to-machine (M2M) device, or other types of mobile communication devices. In an example implementation, UE 210 may include a prepaid mobile communication device that is capable of communicating with other UEs, carrier selection device 220, carrier network 250, and/or server device 260.

Carrier selection device 220 may include one or more computation and communication devices that may enable UE 210 to select a wireless carrier from a list of wireless carriers. In one example implementation, carrier selection device 220 may receive, from UE 210, a device identifier (e.g., a MDN), account information, and location information associated with UE 210, and may determine carrier pricing information based on the received information. Carrier selection device 220 may provide the carrier pricing information (e.g., a list of carriers and prices) to UE 210, and may receive, from UE 210, an indication of a selected carrier (e.g., carrier network 250) based on the carrier pricing information. Carrier selection device 220 may provide the device identifier to carrier provisioning device 240, and carrier provisioning device 240 may provision UE 210 for carrier network 250 based on the device identifier.

Network 230 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one example, network 230 may include a network, such as a WiFi network, that may be accessed by UE 210 without using a cellular service.

Carrier provisioning device 240 may include one or more computation and communication devices that may provision one or more UEs 210 for using carrier network 250. In one example implementation, carrier provisioning device 240 may receive, from carrier selection device 220, a device identifier associated with UE 210. Carrier provisioning device 240 may enable UE 210 to be provisioned in carrier network 250, based on the device identifier, by providing provisioning information to carrier network 250. The provisioning information may include information about UE 210 (e.g., the device identifier, account information, etc.) that carrier network 250 may use to provision UE 210 in carrier network 250. In one example, the functionality of carrier selection device 220 and carrier provisioning device 250 may be combined in a single device.

Carrier network 250 may include a wireless access network (e.g., a LTE network, an eHRPD network, etc.), and a core network that includes core network equipment, such as a PGW, a SGW, a MME, etc. In one example implementation, carrier network 250 may provide UE 210 with everything that is necessary to set up a service. Carrier network 250 may activate the service for UE 210 and may populate various network databases (e.g., an ENUM database, a LNP database, an AAA database, etc.) with information associated with UE 210 and/or information associated with a user of UE 210 (e.g., the MDN, the account information, etc.).

Server device 260 may include one or more computation and communication devices that may exchange content (e.g., audio, video, audio and video, applications, data, etc.) with UE 210. In one example, server device 260 may include an application server storing one or more applications that may be downloaded by UE 210. Alternatively, or additionally, server device 260 may include a content server that may provide streaming video to UE 210. Alternatively, or additionally, server device 260 may include a repository device that receives content from UE 210 and stores the content.

Although FIG. 2 shows example devices of environment 200, in other implementations, environment 200 may include fewer devices, different devices, differently arranged devices, or additional devices than depicted in FIG. 2. Alternatively, or additionally, one or more devices of environment 200 may perform one or more tasks described as being performed by one or more other devices of environment 200.

Figure 3:
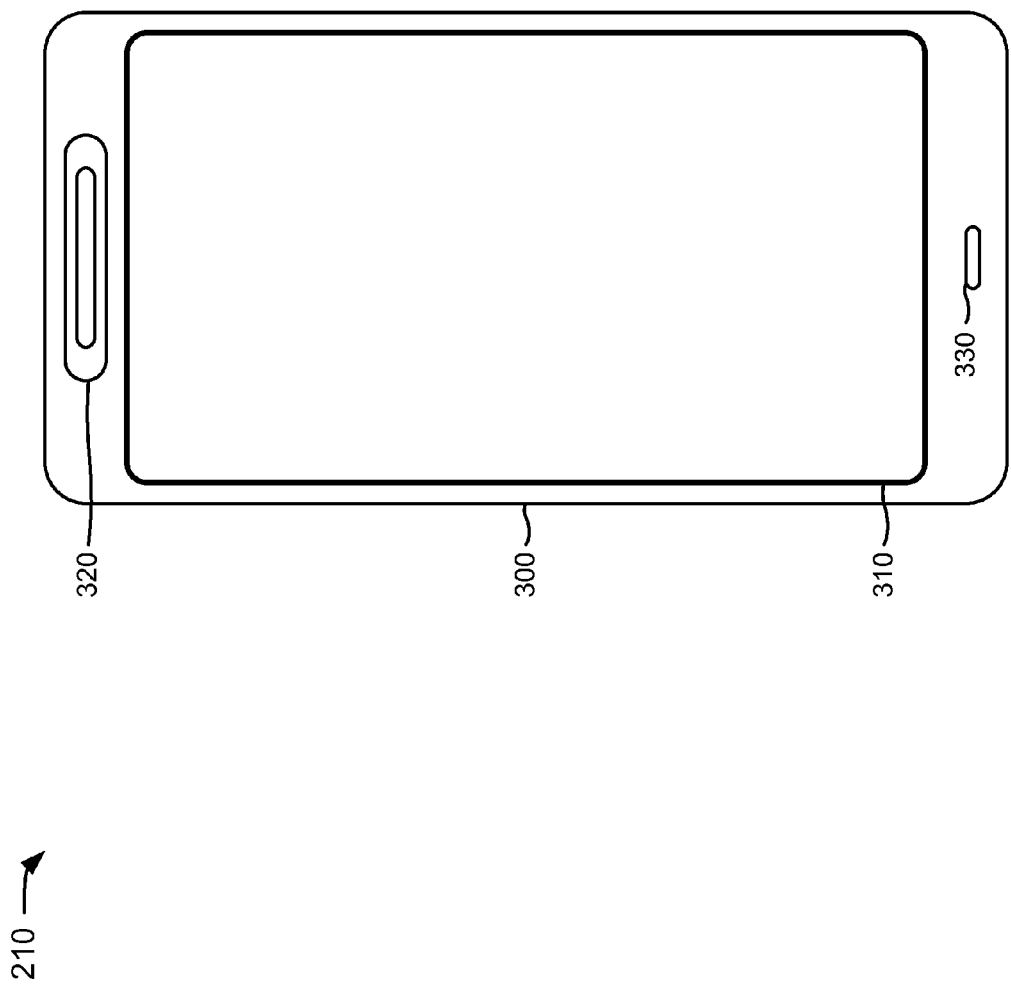
FIG. 3 is a diagram of example external components of a user equipment (UE) of the environment depicted in FIG. 2.

FIG. 3 is a diagram of example external components of UE 210 (FIG. 2). As shown, UE 210 may include a housing 300, a display 310, a speaker 320, and/or a microphone 330.

Housing 300 may protect the components of UE 210 from outside elements. Housing 300 may include a structure configured to hold devices and components used in UE 210, and may be formed from a variety of materials. For example, housing 300 may be formed from plastic, metal, a composite, etc., and may be configured to support display 310, speaker 320, and/or microphone 330.

Display 310 may provide visual information to the user. For example, display 310 may display text input into UE 210, text, images, video, and/or graphics received from another device, and/or information regarding incoming or outgoing calls or text messages, emails, media, games, phone books, address books, the current time, etc. In one implementation, display 310 may include a touch screen display that may be configured to receive a user input when the user touches display 310. For example, the user may provide an input to display 310 directly, such as via the user's finger, or via other input objects, such as a stylus. User inputs received via display 310 may be processed by components and/or devices operating in UE 210. The touch screen display may permit the user to interact with UE 210 in order to cause UE 210 to perform one or more operations.

Speaker 320 may provide audible information to a user of UE 210. Speaker 320 may be located in an upper portion of UE 210, and may function as an ear piece when a user is engaged in a communication session using UE 210. Speaker 320 may also function as an output device for music and/or audio information associated with games and/or video images played on UE 210.

Microphone 330 may receive audible information from the user. Microphone 330 may include a device that converts speech or other acoustic signals into electrical signals for use by UE 210. Microphone 330 may be located proximate to a lower side of UE 210.

Figure 4:
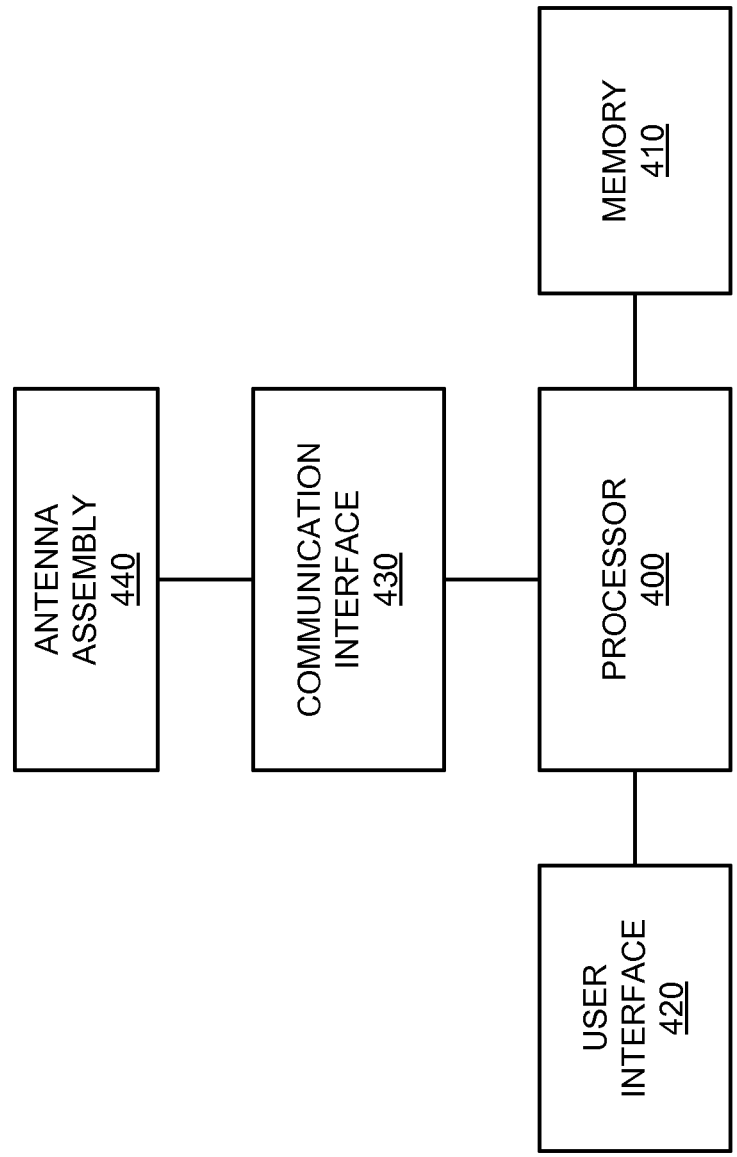
FIG. 4 is a diagram of example internal components of the UE of FIG. 3.

FIG. 4 is an example diagram of internal components of UE 210 (FIG. 2). As illustrated, UE 210 may include a processor 400, memory 410, a user interface 420, a communication interface 430, and/or an antenna assembly 440.

Processor 400 may include one or more processors or microprocessors that interpret and execute instructions. Alternatively, or additionally, processor 400 may be implemented as or include one or more ASICs, FPGAs, or the like.

Memory 410 may include a RAM or another type of dynamic storage device that stores information and instructions for execution by processor 400, a ROM or another type of static storage device that stores static information and instructions for processor 400, and/or some other type of magnetic or optical recording medium and its corresponding drive for storing information and/or instructions.

User interface 420 may include mechanisms for inputting information to UE 210 and/or for outputting information from UE 210. Examples of input and output mechanisms might include buttons (e.g., control buttons, keys of a keypad, a joystick, etc.) or a touch screen interface (e.g., display 310) to permit data and control commands to be input into UE 210; a speaker (e.g., speaker 320) to receive electrical signals and output audio signals; a microphone (e.g., microphone 330) to receive audio signals and output electrical signals; a display (e.g., display 310) to output visual information (e.g., text input into UE 210); a vibrator to cause UE 210 to vibrate; etc.

Communication interface 430 may include, for example, a transmitter that may convert baseband signals from processor 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As described herein, UE 210 may perform certain operations in response to processor 400 executing software instructions contained in a computer-readable medium, such as memory 410. A computer-readable medium may be defined as a non-transitory memory device. A memory device may include space within a single physical memory device or spread across multiple physical memory devices. The software instructions may be read into memory 410 from another computer-readable medium, or from another device via communication interface 430. The software instructions contained in memory 410 may cause processor 400 to perform processes described herein. Alternatively, hardwired circuitry may be used in place of or in combination with software instructions to implement processes described herein. Thus, implementations described herein are not limited to any specific combination of hardware circuitry and software.

Although FIGS. 3 and 4 show example components of UE 210, in other implementations, UE 210 may include fewer components, different components, differently arranged components, or additional components than depicted in FIGS. 3 and/or 4. Alternatively, or additionally, one or more components of UE 210 may perform one or more other tasks described as being performed by one or more other components of UE 210.

Figure 5:
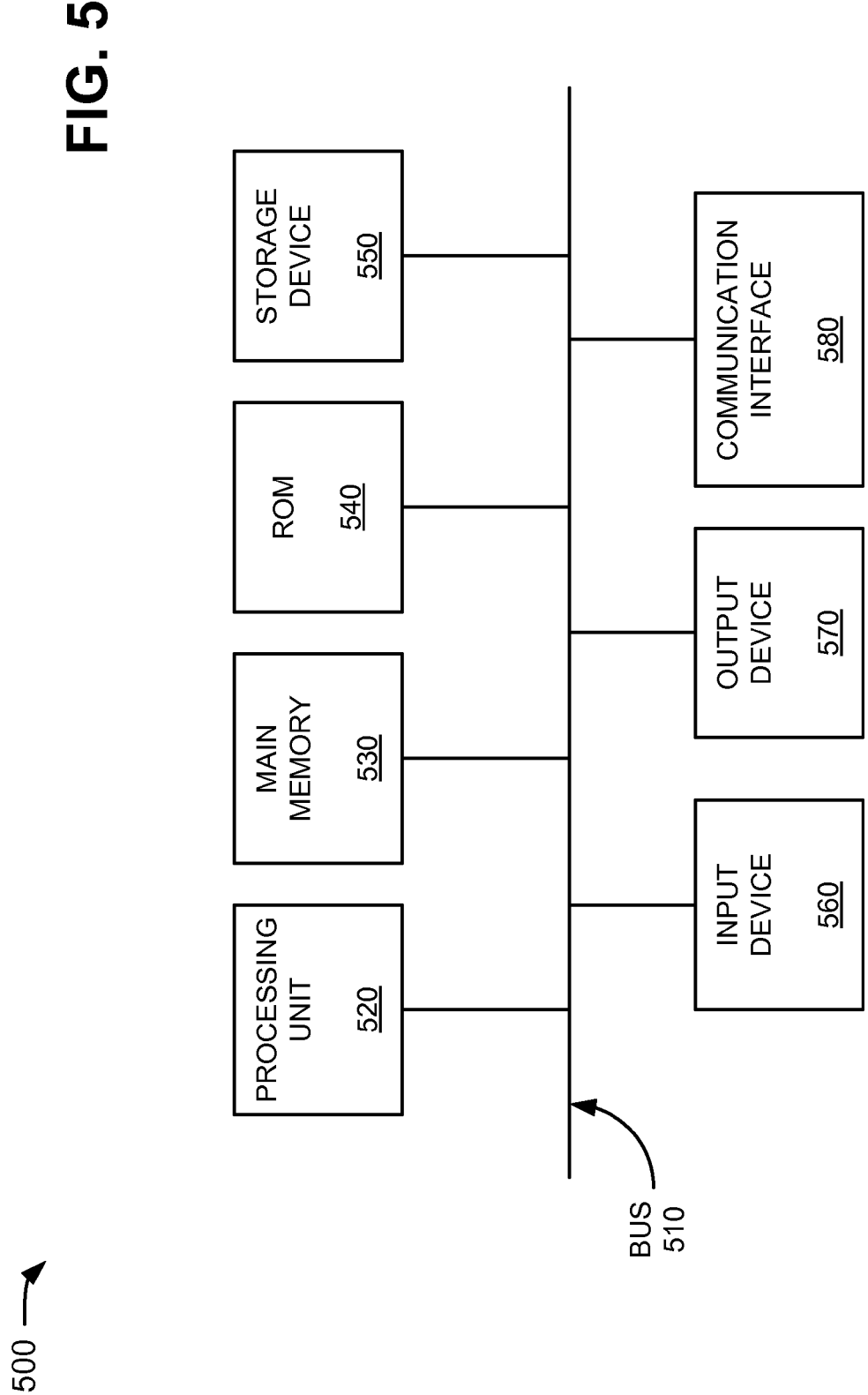
FIG. 5 is a diagram of example components of one or more devices of the environment depicted in FIG. 2.

FIG. 5 is a diagram of example components of a device 500 that may correspond to one or more devices of environment 200. In one example implementation, one or more of the devices of environment 200 may include one or more devices 500 or one or more components of device 500. As illustrated, device 500 may include a bus 510, a processing unit 520, a main memory 530, a ROM 540, a storage device 550, an input device 560, an output device 570, and/or a communication interface 580. Bus 510 may include a path that permits communication among the components of device 500.

Processing unit 520 may include one or more processors, microprocessors, or other types of processing units that may interpret and execute instructions. Main memory 530 may include a RAM or another type of dynamic storage device that may store information and instructions for execution by processing unit 520. ROM 540 may include a ROM device or another type of static storage device that may store static information and/or instructions for use by processing unit 520. Storage device 550 may include a magnetic and/or optical recording medium and its corresponding drive.

Input device 560 may include a mechanism that permits an operator to input information to device 500, such as a keyboard, a mouse, a pen, a microphone, voice recognition and/or biometric mechanisms, etc. Output device 570 may include a mechanism that outputs information to the operator, including a display, a printer, a speaker, etc. Communication interface 580 may include any transceiver-like mechanism that enables device 500 to communicate with other devices and/or systems. For example, communication interface 580 may include mechanisms for communicating with another device or system via a network.

As described herein, device 500 may perform certain operations in response to processing unit 520 executing software instructions contained in a computer-readable medium, such as main memory 530. The software instructions may be read into main memory 530 from another computer-readable medium or from another device via communication interface 580. The software instructions contained in main memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows example components of device 500, in other implementations, device 500 may include fewer components, different components, differently arranged components, or additional components than depicted in FIG. 5. Alternatively, or additionally, one or more components of device 500 may perform one or more other tasks described as being performed by one or more other components of device 500.

Figure 6:
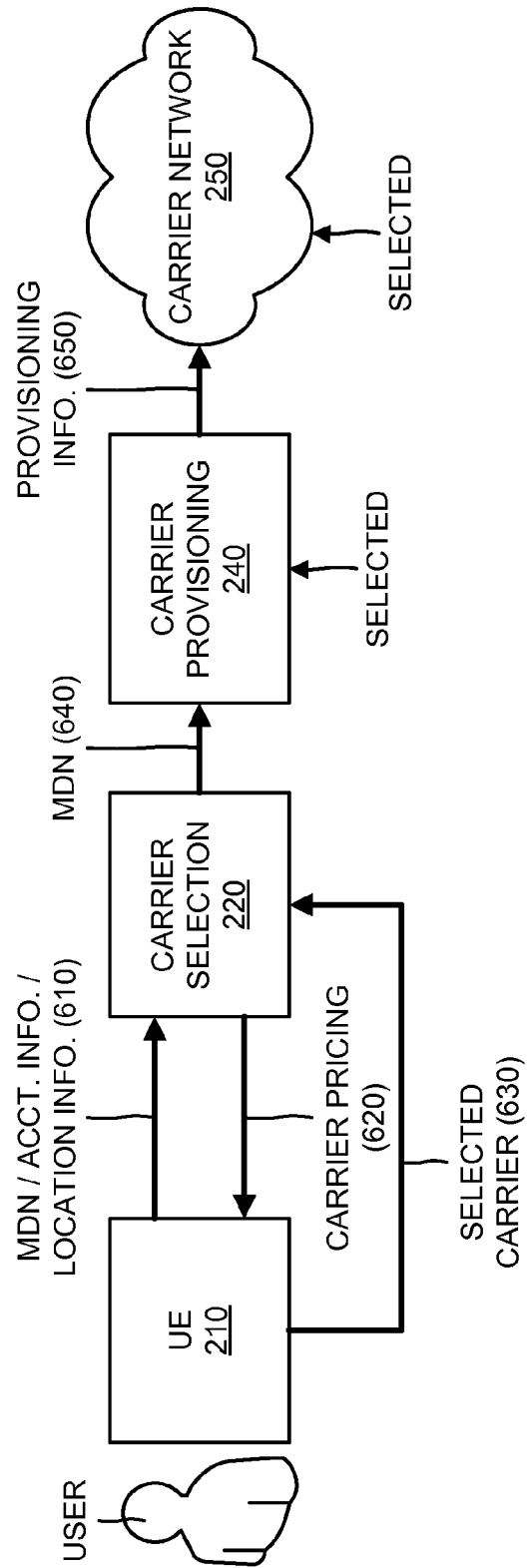
FIG. 6 is a diagram of example operations capable of being performed by an example portion of the environment illustrated in FIG. 2.

FIG. 6 is a diagram of example operations capable of being performed by an example portion 600 of environment 200 (FIG. 2). As shown in FIG. 6, environment portion 600 may include UE 210, carrier selection device 220, carrier provisioning device 240, and carrier network 250. UE 210, carrier selection device 220, carrier provisioning device 240, and carrier network 250 may include the features described above in connection with one or more of, for example, FIGS. 1-4.

As further shown in FIG. 6, a user may utilize UE 210 to input account information associated with the user. The account information may include a name of the user, a password associated with the user, billing information associated with the user (e.g., an account number, a credit card number, a billing address, etc. associated with the user), etc. The user may cause UE 210 to send a device identifier (e.g., a mobile directory number (MDN), a mobile identification number (MIN), etc.) associated with UE 210, the account information, and location information to carrier selection device 220, as indicated by reference number 610. The location information may include a geographical location of UE 210, GPS coordinates associated with UE 210, etc.

Carrier selection device 220 may receive the device identifier, the account information, and the location information, and may determine carrier pricing information 620 (e.g., different carrier prices) based on the device identifier, the account information, and/or the location information. For example, carrier selection device 220 may determine different carrier prices for UE 210 based on the location of UE 210 (e.g., a carrier located closer to UE 210 may provide better prices than a carrier located further away from UE 210). Alternatively, or additionally, carrier selection device 220 may determine different carrier prices for UE 210 based on the account information (e.g., a particular carrier may provide better prices for UE 210 since UE 210 may be prepaid for a particular plan, such as a fourth generation (4G) wireless plan provided by the particular carrier). Carrier selection device 220 may provide carrier pricing information 620 to UE 210.

UE 210 may receive carrier pricing information 620, and may display carrier pricing information 620 on a user interface associated with UE 210. For example, the user interface may display a carrier name and a carrier price (e.g., per use of carrier services, per outbound call, per inbound call, per SMS message, per an amount of data received by UE 210, etc.). In one example, the user interface may provide a list of carriers and prices associated with the carriers. The user interface may rank the carriers in a particular order (e.g., with the least expensive carrier listed first and most expensive carrier listed last) or may not rank the carriers in any particular order. Alternatively, or additionally, the user interface may display other information provided by carrier selection device 220 to UE 210. For example, the user interface may display information about services offered by different carriers (e.g., one carrier may be more expensive but may offer more services than a cheaper carrier), special offers available from the carriers, advertisements relating to particular carrier services, etc. The user interface may instruct the user to select a carrier from the list, and the user may select one of the carriers from the list (e.g., using a touch screen display of UE 210). Based on the selection of the one carrier, UE may provide an indication 630 of the selected carrier to carrier selection device 220.

Carrier selection device 220 may receive indication 630 of the selected carrier, and may provide a device identifier 640 (e.g., the MDN) of UE 210 to carrier provisioning device 240 based on the receipt of indication 630. In one example, carrier provisioning device 240 and carrier network 250 may be associated with the selected carrier. Carrier provisioning device 240 may receive device identifier 640, and may enable UE 210 to be provisioned in carrier network 250, based on device identifier 640, by providing provisioning information 650 to carrier network 250. Provisioning information 640 may include information about UE 210 (e.g., device identifier 640, the account information, etc.) that carrier network 250 may use to provision UE 210 in carrier network 250. Carrier network may provide UE 210 with everything that is necessary to set up a service. Carrier network 250 may activate the service for UE 210 and may populate various network databases (e.g., an ENUM database, a LNP database, an AAA database, etc.) with information associated with UE 210 and/or the user (e.g., the MDN, the account information, etc.).

Once UE 210 is provisioned for carrier network 250, the user may cause UE 210 to connect to carrier network 250. In one example, the user may power UE 210 on and off so that UE 210 connects to carrier network 250. Once UE 210 is connected to carrier network 250, UE 210 may perform various communication operations via carrier network 250, such as place or receive calls, exchange SMS messages, exchange content, etc. The user may utilize UE 210 to change the selected carrier at any time. In one example, if the user selects another carrier, the user (e.g., via UE 210) may inform the previously selected carrier that UE 210 will no longer be using resources associated with previously selected carrier.

Although FIG. 6 shows example components of environment portion 600, in other implementations, environment portion 600 may include fewer components, different components, differently arranged components, or additional components than depicted in FIG. 6. Alternatively, or additionally, one or more components of environment portion 600 may perform one or more other tasks described as being performed by one or more other components of environment portion 600.

Figure 7:
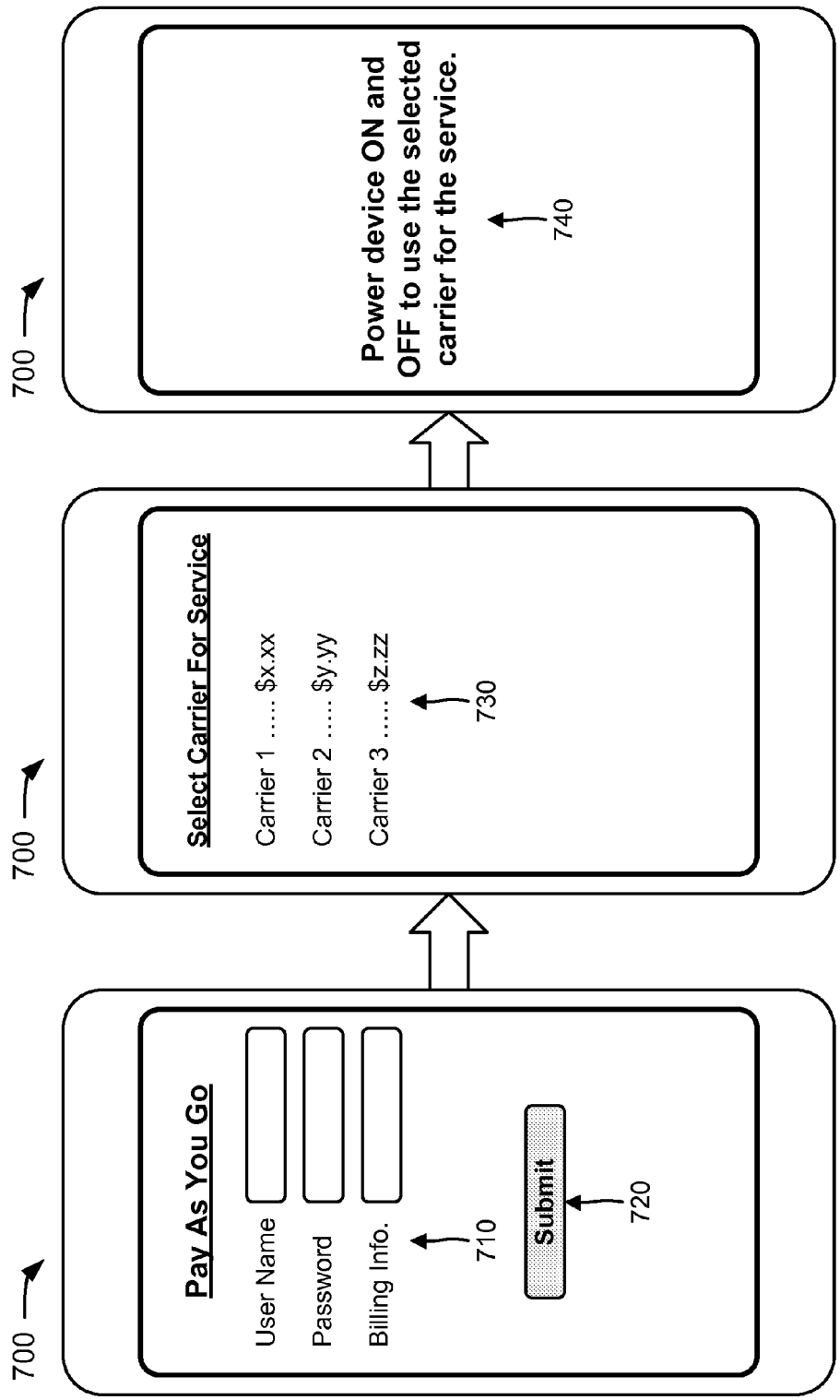
FIGS. 7A-7C are diagrams of an example user interface that may be generated or provided by the UE depicted in FIGS. 3 and 4.
Figure 8:
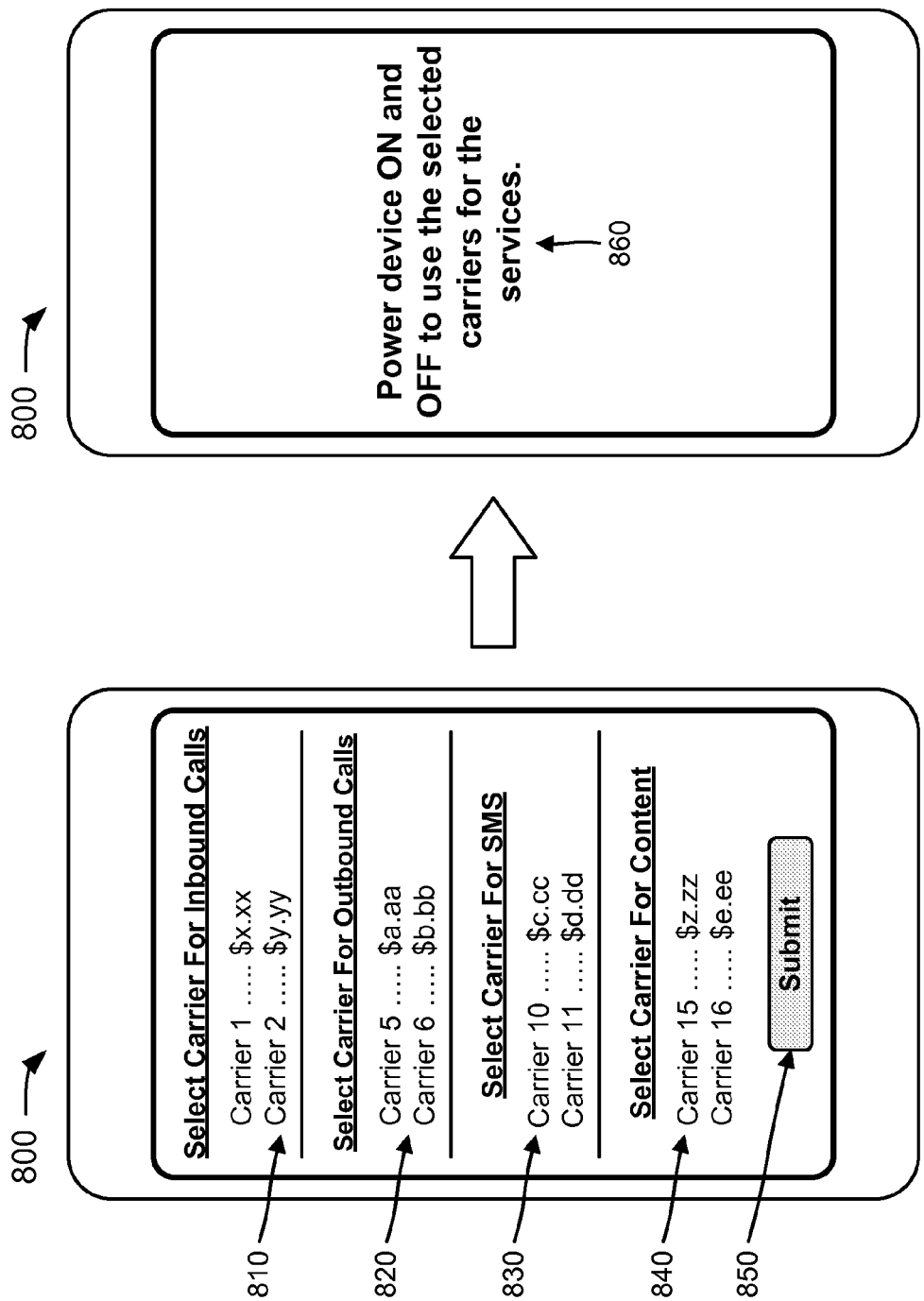
FIGS. 8A and 8B are diagrams of another example user interface that may be generated or provided by the UE depicted in FIGS. 3 and 4.

FIGS. 7A-7C are diagrams of an example user interface 700 that may be generated or provided by UE 210. User interface 700 and user interface 800 depicted in FIGS. 8A and 8B (referred to herein, as "user interfaces 700/800") may include graphical user interfaces (GUIs) or a non-graphical user interfaces, such as text-based interfaces. User interfaces 700/800 may provide information to users via customized interfaces (e.g., proprietary interfaces) and/or other types of interfaces (e.g., browser-based interfaces, etc.). User interfaces 700/800 may receive user inputs via one or more input devices (e.g., display 310, FIG. 3), may be user-configurable (e.g., a user may change the sizes of user interfaces 700/800, information displayed in user interfaces 700/800, color schemes used by user interfaces 700/800, positions of text, images, icons, windows, etc., in user interfaces 700/800, etc.), and/or may not be user-configurable. Information associated with user interfaces 700/800 may be selected and/or manipulated by a user of UE 210 (e.g., via a touch screen display, a mouse, a keyboard, a keypad, voice commands, etc.).

As shown in FIG. 7A, user interface 700 may enable the user of UE 210 to input a variety of information associated with the user and/or UE 210. For example, the user may input a user name, a password, billing information, etc. via user interface 700, as indicated by reference number 710. Once the user has input information 710, the user may cause UE 210 to send a device identifier (e.g., a MDN, a MIN, etc.) associated with UE 210, the account information, and/or location information to carrier selection device 220 by selecting a submit mechanism 720 (e.g., a button, an icon, a hyperlink, etc.).

Based on the information submitted via submit mechanism 720, carrier selection device 220 may provide carrier pricing information 620 to UE 210, and UE 210 may display carrier pricing information 620 on user interface 700 shown in FIG. 7B. As shown in FIG. 7B, user interface 700 may provide a list 730 of three carriers (e.g., Carrier 1, Carrier 2, and Carrier 3) and prices associated with the three carriers (e.g., $x.xx, $y.yy, and $z.zz). In one example, user interface 700 may rank the three carriers in a particular order (e.g., with the least expensive carrier listed first and most expensive carrier listed last) or may not rank the three carriers in any particular order. Alternatively, or additionally, user interface 700 may display other information provided by carrier selection device 220 to UE 210. For example, user interface 700 may display information about services offered by different carriers (e.g., one carrier may be more expensive but may offer more services than a cheaper carrier), special offers available from the carriers, advertisements relating to particular carrier services, etc. User interface 700 may instruct the user to select a carrier from list 730, and the user may select one of the carriers from list 730 (e.g., using a touch screen display of UE 210).

After the user selects a carrier from list 730, UE 210 may provide indication 630 of the selected carrier to carrier selection device 220, and carrier selection device 220 may provide information associated with UE 210 (e.g., device identifier 640) to carrier provisioning device 240. Carrier provisioning device 240 may provision UE 210 for utilizing carrier network 250, as described above in connection with FIG. 6.

Once UE 210 is provisioned for carrier network 250, the user may cause UE 210 to connect to carrier network 250. In one example, UE 210 may instruct the user to power UE 210 on and off, as shown in FIG. 7C by reference number 740, in order to connect UE 210 to carrier network 250. Based on instructions 740, the user may power UE 210 on and off so that UE 210 connects to carrier network 250. Once UE 210 is connected to carrier network 250, UE 210 may perform various communication operations via carrier network 250, such as place or receive calls, exchange SMS messages, exchange content, etc.

Although user interface 700 depicts a variety of information, in other implementations, user interface 700 may depict less information, different information, differently arranged information, and/or additional information than depicted in FIGS. 7A-7C. In one example implementation, microphone 330 (FIG. 3) may be utilized by the user of UE 210 to provide voice commands to UE 210. The voice commands may be used in place of and/or in addition to the user inputs described above in connection with FIGS. 7A-7C.

FIGS. 8A and 8B are diagrams of another example user interface 800 that may be generated or provided by UE 210. Based on the information submitted via submit mechanism 720 (FIG. 7A), carrier selection device 220 may provide carrier pricing information 620 to UE 210, and UE 210 may display carrier pricing information 620 on user interface 800 shown in FIG. 8A. As shown in FIG. 8A, user interface 800 may provide a first list 810 of carriers (e.g., Carrier 1 and Carrier 2) and prices associated with the carriers (e.g., $x.xx and $y.yy) for inbound calls received by UE 210. User interface 800 may provide a second list 820 of carriers (e.g., Carrier 5 and Carrier 5) and prices associated with the carriers (e.g., $a.aa and $b.bb) for outbound calls placed by UE 210. User interface 800 may provide a third list 830 of carriers (e.g., Carrier 10 and Carrier 11) and prices associated with the carriers (e.g., $c.cc and $d.dd) for SMS messages exchanged by UE 210. User interface 800 may provide a fourth list 840 of carriers (e.g., Carrier 15 and Carrier 16) and prices associated with the carriers (e.g., $z.zz and $e.ee) for content exchanged by UE 210. In one example implementation, user interface 800 may enable the user to select one or more different carriers for one or more different services (e.g., inbound calls, outbound calls, SMS messages, etc.).

User interface 800 may rank the carriers in lists 810-840 in a particular order (e.g., with the least expensive carrier listed first and most expensive carrier listed last) or may not rank the carriers in lists 810-840 in any particular order. Alternatively, or additionally, user interface 800 may display other information provided by carrier selection device 220 to UE 210. For example, user interface 800 may display information about services offered by different carriers, special offers available from the carriers, advertisements relating to particular carrier services, etc. User interface 800 may instruct the user to select a carrier from each of lists 810-840, and the user may select one of the carriers from each of lists 810-840 (e.g., using a touch screen display of UE 210). Once the user has selected a carrier from each of lists 810-840, the user may cause UE 210 to send indications of the selected carriers to carrier selection device 220 by selecting a submit mechanism 850 (e.g., a button, an icon, a hyperlink, etc.).

Upon receiving the indications from UE 210, carrier selection device 220 may provide information associated with UE 210 (e.g., device identifier 640) to carrier provisioning device 240. Carrier provisioning device 240 may provision UE 210 for utilizing the selected carriers, as described above in connection with FIG. 6. Once UE 210 is provisioned for the selected carriers, the user may cause UE 210 to connect to one or more of the selected carriers. In one example, UE 210 may instruct the user to power UE 210 on and off, as shown in FIG. 8B by reference number 860, in order to connect UE 210 to the selected carriers. Based on instructions 860, the user may power UE 210 on and off so that UE 210 connects to the selected carriers. Once UE 210 is connected to the selected carriers, UE 210 may perform various communication operations via the selected carriers, such as place or receive calls, exchange SMS messages, exchange content, etc.

Although user interface 800 depicts a variety of information, in other implementations, user interface 800 may depict less information, different information, differently arranged information, and/or additional information than depicted in FIGS. 8A and 8B. In one example implementation, microphone 330 (FIG. 3) may be utilized by the user of UE 210 to provide voice commands to UE 210. The voice commands may be used in place of and/or in addition to the user inputs described above in connection with FIGS. 8A and 8B.

Figure 9:
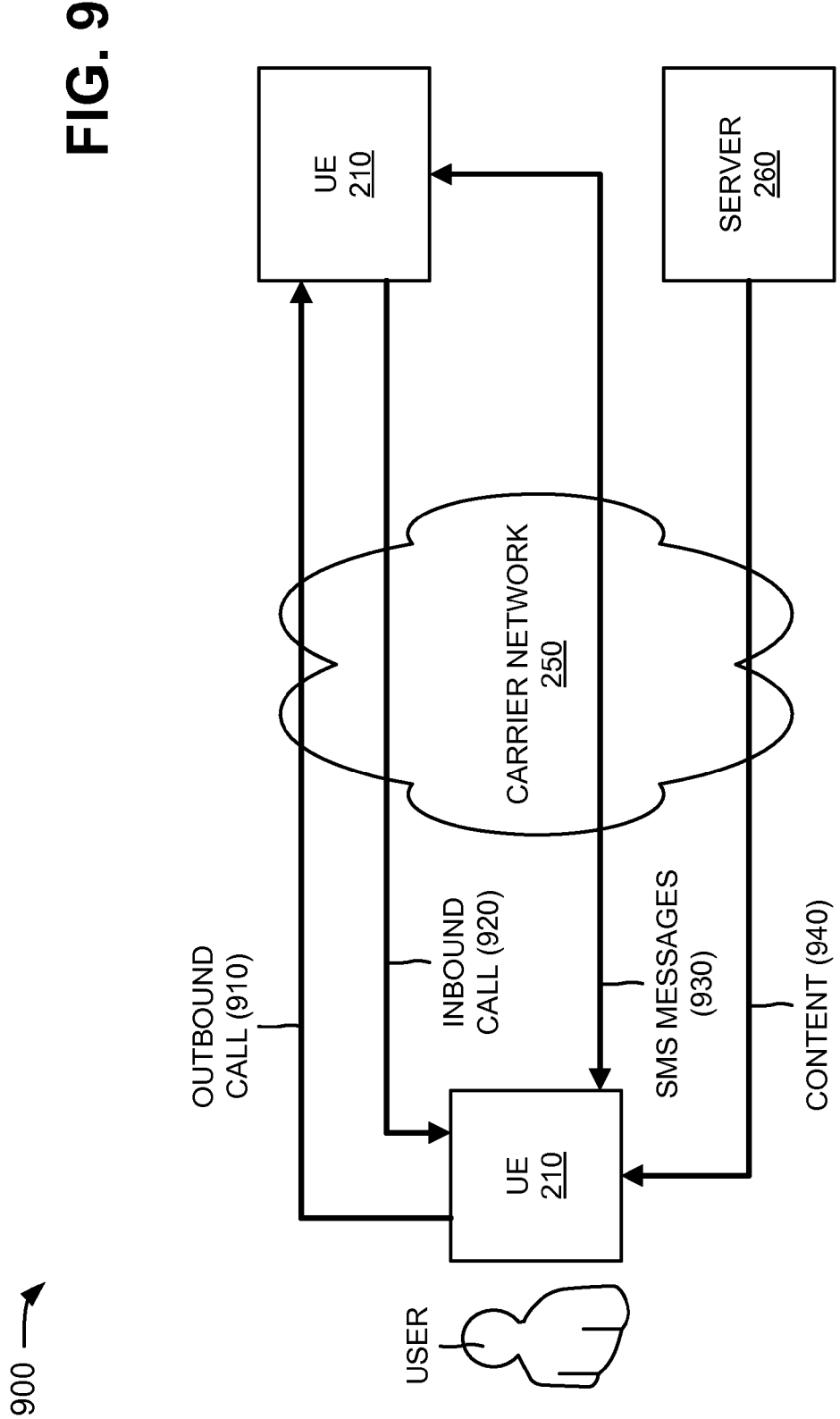
FIG. 9 is a diagram of example operations capable of being performed by an example portion of the environment illustrated in FIG. 2.

FIG. 9 is a diagram of example operations capable of being performed by an example portion 900 of environment 200 (FIG. 2). As shown in FIG. 9, environment portion 900 may include UEs 210, carrier network 250, and server device 260. UEs 210, carrier network 250, and server device 260 may include the features described above in connection with one or more of, for example, FIGS. 1-8B.

It may be assumed that a first UE 210 associated with a user has selected and been provisioned for carrier network 250, as described above in connection with FIG. 6. As further shown in FIG. 9, once the first UE 210 is connected to carrier network 250, the first UE 210 may perform various communication operations via carrier network 250. For example, as shown in FIG. 9, the first UE 210 may place an outbound call 910 to a second UE 210, or may receive an inbound call 920 from the second UE 210, via carrier network 250. Alternatively, or additionally, the first UE 210 may exchange SMS messages 930 with the second UE 210 via carrier network 250. Alternatively, or additionally, the first UE 210 may exchange content 940 (e.g., applications, data, audio, video, etc.) with server device 260 via carrier network 250. Alternatively, or additionally, the first UE 210 may perform other communication operations via carrier network 250, such as, for example, video conferencing, instant messaging, etc.

Although FIG. 9 shows example components of environment portion 900, in other implementations, environment portion 900 may include fewer components, different components, differently arranged components, or additional components than depicted in FIG. 9. Alternatively, or additionally, one or more components of environment portion 900 may perform one or more other tasks described as being performed by one or more other components of environment portion 900.

Figure 10:
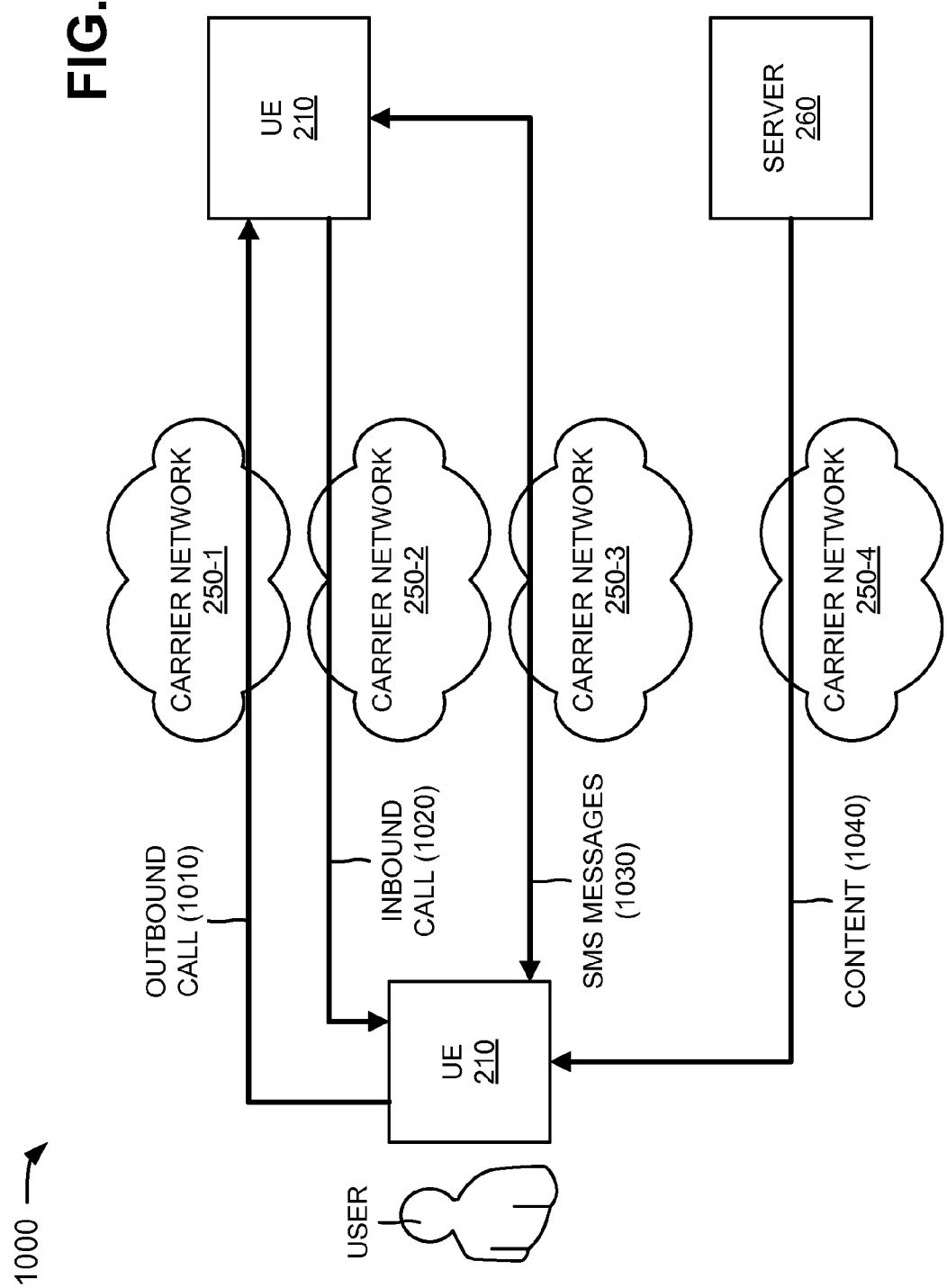
FIG. 10 is a diagram of example operations capable of being performed by another example portion of the environment depicted in FIG. 2.

FIG. 10 is a diagram of example operations capable of being performed by another example portion 1000 of environment 200 (FIG. 2). As shown in FIG. 10, environment portion 1000 may include UEs 210, a first carrier network 250-1, a second carrier network 250-2, a third carrier network 250-3, a fourth carrier network 250-4, and server device 260. UEs 210, carrier networks 250-1 through 250-4, and server device 260 may include the features described above in connection with one or more of, for example, FIGS. 1-9.

It may be assumed that a first UE 210 associated with a user has selected and been provisioned for first carrier network 250-1 for outbound calls, as described above in connection with FIGS. 6, 8A, and 8B. It may also be assumed that the first UE 210 has selected and been provisioned for second carrier network 250-1 for inbound calls, third carrier network 250-3 for SMS messages, and fourth carrier network 250-4 for content, as described above in connection with FIGS. 6, 8A, and 8B. Each of carrier networks 250-1 through 250-4 may be associated with a different carrier and may be separate and distinct from each other. In one example, the first UE 210 may utilize the different carrier networks 250-1 through 250-4 at the same time or at different times. If the first UE 210 utilizes the different carrier networks 250-1 through 250-4 at the same time, the first UE 210 may include multiple radio interfaces that are capable of communicating with carrier networks 250-1 through 250-4 at the same time.

As further shown in FIG. 10, when the first UE 210 is connected to carrier networks 250-1 through 250-4, the first UE 210 may perform various communication operations via carrier networks 250-1 through 250-4. For example, as shown in FIG. 10, the first UE 210 may place an outbound call 1010 to a second UE 210 via first carrier network 250-1. Alternatively, or additionally the first UE 210 may receive an inbound call 1020 from the second UE 210 via second carrier network 250-2. Alternatively, or additionally, the first UE 210 may exchange SMS messages 1030 with the second UE 210 via third carrier network 250-3. Alternatively, or additionally, the first UE 210 may exchange content 1040 (e.g., applications, data, audio, video, etc.) with server device 260 via fourth carrier network 250-4. Alternatively, or additionally, the first UE 210 may perform other communication operations via one or more of carrier networks 250-1 through 250-4, such as, for example, video conferencing, instant messaging, etc.

Although FIG. 10 shows example components of environment portion 1000, in other implementations, environment portion 1000 may include fewer components, different components, differently arranged components, or additional components than depicted in FIG. 10. Alternatively, or additionally, one or more components of environment portion 1000 may perform one or more other tasks described as being performed by one or more other components of environment portion 1000.

Figure 11:
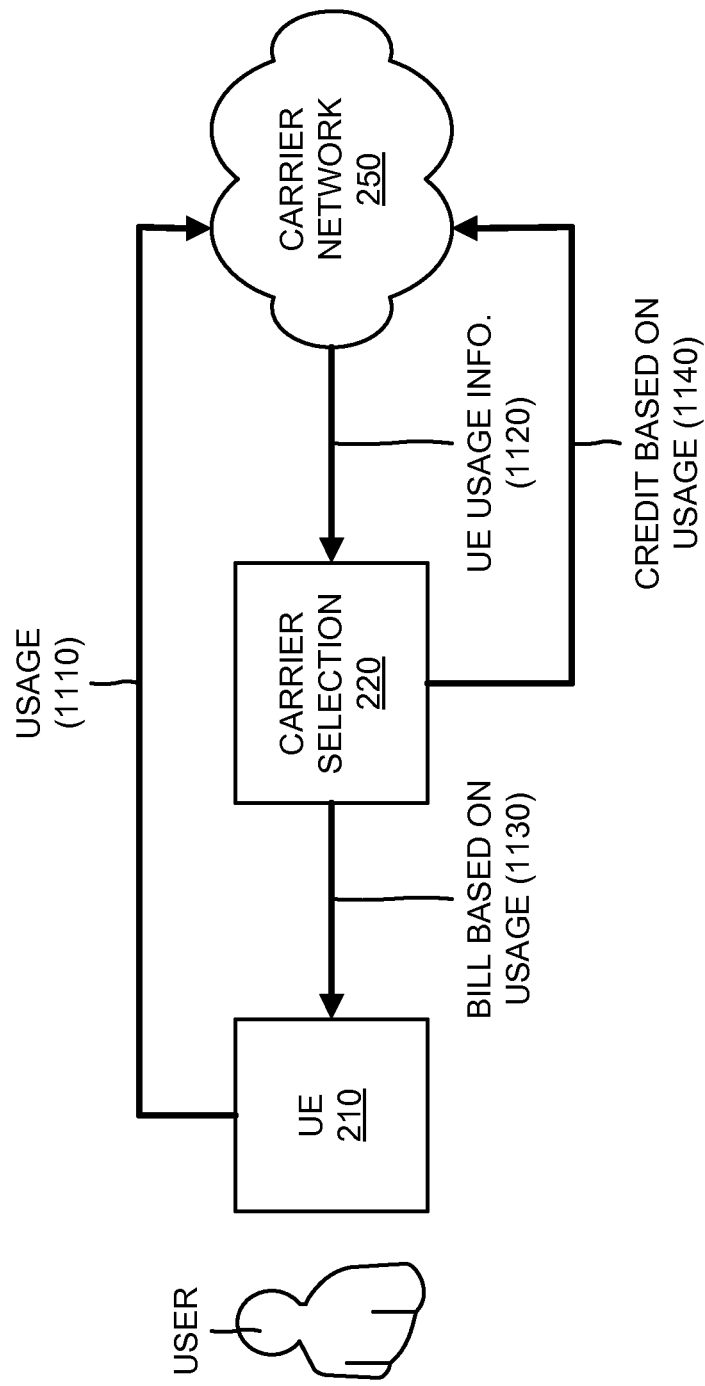
FIG. 11 is a diagram of example billing operations capable of being performed by an example portion of the environment illustrated in FIG. 2.

FIG. 11 is a diagram of example billing operations capable of being performed by an example portion 1100 of environment 200 (FIG. 2). As shown in FIG. 11, environment portion 1100 may include UE 210, carrier selection device 220, and carrier network 250. UE 210, carrier selection device 220, and carrier network 250 may include the features described above in connection with one or more of, for example, FIGS. 1-10.

It may be assumed that UE 210 has selected and been provisioned for carrier network 250, as described above in connection with FIG. 6. As further shown in FIG. 11, once UE 210 is connected to carrier network 250, a user may utilize UE 210 to perform various communication operations (e.g., place and receive calls, exchange SMS messages, etc.) via carrier network 250. Performance of such communication operations may be referred to as usage 1110 of carrier network 250.

Based on usage 1110, carrier network 250 may provide usage information 1120 to carrier selection device 220. Usage information 1120 may include information identifying usage 1110 by UE 210 of carrier network 250. Carrier selection device 220 may receive usage information 1120, and may generate billing information for the user based on usage information 1120. Carrier selection device 220 may provide the billing information to the user and/or to UE 210, as indicated by reference number 1130. In one example, carrier selection device 220 may bill the user for usage 1110 of carrier network 250 in real time (e.g., for each communication operation, for a particular number of communication operations, every day, etc.). Such real time billing for usage 1110 may enable carrier selection device 220 to prevent fraudulent use of UE 210, such as when UE 210 is stolen from the user.

As further shown in FIG. 11, if the user prepaid carrier selection device 220 for use of UE 210, carrier selection device 220 may provide a credit to carrier network 250 based on usage 1110, as indicated by reference number 1140. In such a scenario, carrier selection device 220 may not provide the billing information to the user and/or UE 210, but rather may provide an indication that carrier network 250 has been credited based on usage 1110 by UE 210. The indication may also include information identifying a remaining balance on the user's prepaid amount after the credit is applied for usage 1110.

Although FIG. 11 shows example components of environment portion 1100, in other implementations, environment portion 1100 may include fewer components, different components, differently arranged components, or additional components than depicted in FIG. 11. Alternatively, or additionally, one or more components of environment portion 1100 may perform one or more other tasks described as being performed by one or more other components of environment portion 1100.

Figure 12:
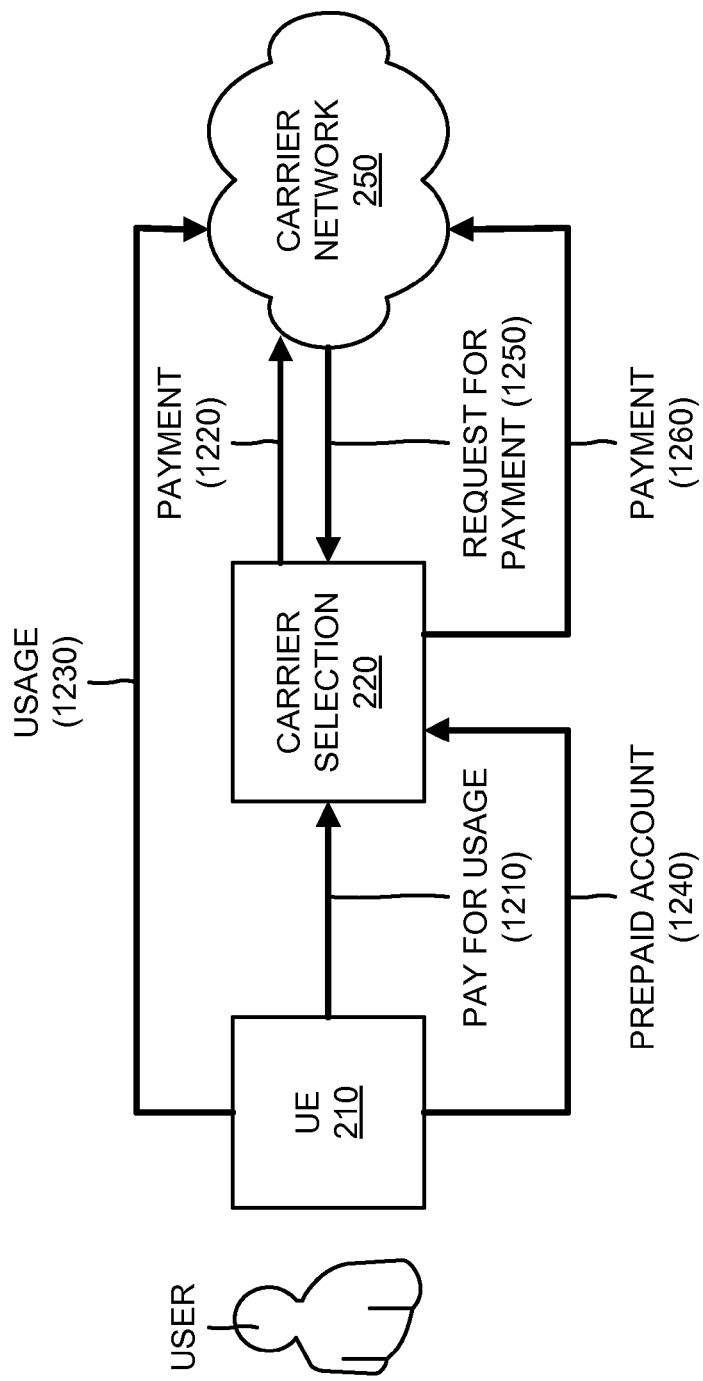
FIG. 12 is a diagram of example billing operations capable of being performed by another example portion of the environment depicted in FIG. 2.

FIG. 12 is a diagram of example billing operations capable of being performed by another example portion 1200 of environment 200 (FIG. 2). As shown in FIG. 12, environment portion 1200 may include UE 210, carrier selection device 220, and carrier network 250. UE 210, carrier selection device 220, and carrier network 250 may include the features described above in connection with one or more of, for example, FIGS. 1-11.

It may be assumed that UE 210 has selected and been provisioned for carrier network 250, as described above in connection with FIG. 6. As further shown in FIG. 12, a user may utilize UE 210 to pay carrier selection device 220 for usage of carrier network 250, as indicated by reference number 1210. The payment for usage may include providing a payment per call, a payment per SMS message, a payment per content download, a payment for a service, etc. to carrier selection device 220. Carrier selection device 220 may provide a payment 1220 (e.g., a payment per communication operation, a payment for a service, etc.) to carrier network 250 on behalf of UE 210. Alternatively, or additionally, UE 210 may provide payment 1220 directly to carrier network 250. Once payment 1220 is provided to carrier network 250, the user may utilize UE 210 to perform various communication operations (e.g., place and receive calls, exchange SMS messages, etc.) via carrier network 250. Performance of such communication operations may be referred to as usage 1230 of carrier network 250.

As further shown in FIG. 12, if the user prepaid carrier selection device 220 for use of UE 210, the user may establish a prepaid account 1240 with carrier selection device 220 or directly with carrier network 250. Based on usage 1230, carrier network 250 may provide a request 1250 for payment to carrier selection device 220. Carrier selection device 220 may provide a payment 1260 to carrier network 250, from the user's prepaid account 1240, in response to request 1250. In such a scenario, carrier selection device 220 may not provide billing information to the user and/or UE 210, but rather may provide an indication that carrier network 250 has been paid, from prepaid account 1240, based on usage 1230 by UE 210. The indication may also include information identifying a remaining balance on the user's prepaid account 1240 after payment 1260 is made for usage 1230.

Although FIG. 12 shows example components of environment portion 1200, in other implementations, environment portion 1200 may include fewer components, different components, differently arranged components, or additional components than depicted in FIG. 12. Alternatively, or additionally, one or more components of environment portion 1200 may perform one or more other tasks described as being performed by one or more other components of environment portion 1200.

Figure 13:
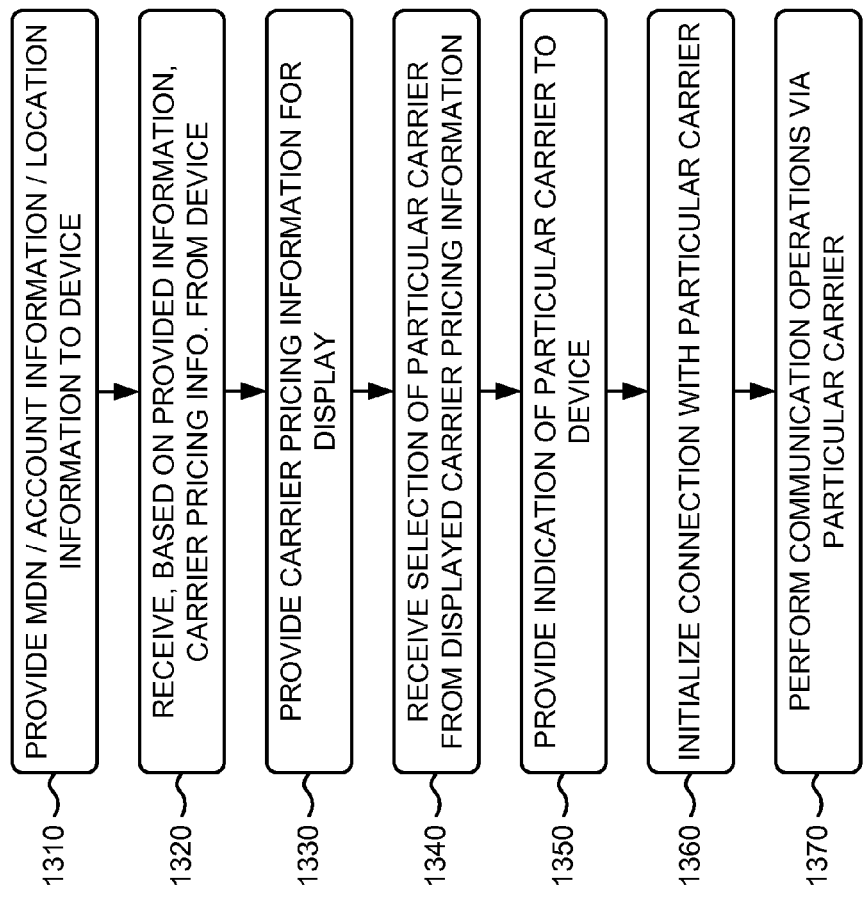
FIGS. 13 and 14 are flow charts of an example process for multicarrier wireless service selection.
Figure 14:
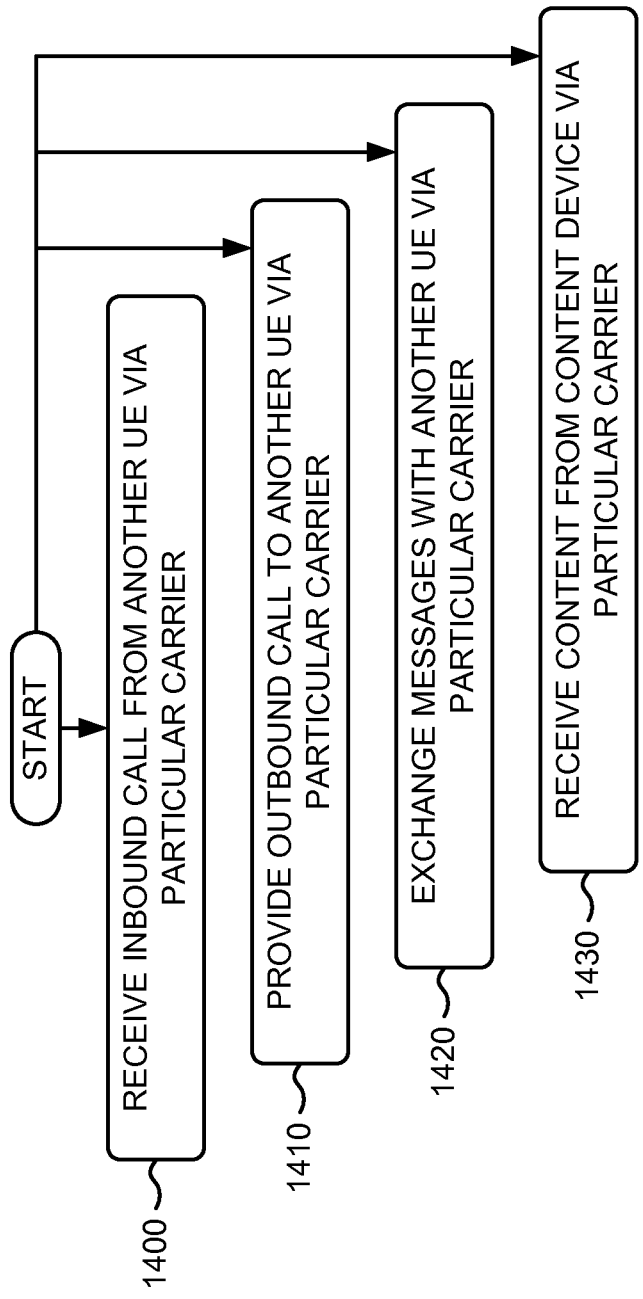

FIGS. 13 and 14 are flow charts of an example process 1300 for multicarrier wireless service selection. In one implementation, process 1300 may be performed by UE 210. Alternatively, or additionally, some or all of process 1300 may be performed by another device or group of devices, including or excluding UE 210.

As shown in FIG. 13, process 1300 may include providing, to a device, a MDN, account information, and location information associated with a UE (block 1310), and receiving, based on the provided information, carrier pricing information from the device (block 1320). For example, in an implementation described above in connection with FIG. 6, a user may utilize UE 210 to input account information associated with the user. The account information may include a name of the user, a password associated with the user, billing information associated with the user (e.g., an account number, a credit card number, a billing address, etc. associated with the user), etc. The user may cause UE 210 to send a device identifier (e.g., a MDN, a MIN, etc.) associated with UE 210, the account information, and location information to carrier selection device 220, as indicated by reference number 610. The location information may include a geographical location of UE 210, GPS coordinates associated with UE 210, etc. Carrier selection device 220 may receive the device identifier, the account information, and the location information, and may determine carrier pricing information 620 (e.g., different carrier prices) based on the device identifier, the account information, and/or the location information. Carrier selection device 220 may provide carrier pricing information 620 to UE 210, and UE 210 may receive carrier pricing information 620.

As further shown in FIG. 13, process 1300 may include providing the carrier pricing information for display (block 1330), and receiving selection of a particular carrier from the displayed carrier pricing information (block 1340). For example, in an implementation described above in connection with FIG. 6, UE 210 may receive carrier pricing information 620, and may display carrier pricing information 620 on a user interface associated with UE 210. For example, the user interface may display a carrier name and a carrier price (e.g., per use of carrier services, per outbound call, per inbound call, per SMS message, per an amount of data received by UE 210, etc.). In one example, the user interface may provide a list of carriers and prices associated with the carriers. The user interface may instruct the user to select a carrier from the list, and the user may select one of the carriers from the list (e.g., using a touch screen display of UE 210).

Returning to FIG. 13, process 1300 may include providing an indication of the particular carrier to the device (block 1350), initializing a connection with the particular carrier (block 1360), and performing communication operations via the particular carrier (block 1370). For example, in an implementation described above in connection with FIG. 6, based on the selection of the one carrier, UE may provide indication 630 of the selected carrier to carrier selection device 220. Carrier selection device 220 may receive indication 630 of the selected carrier, and may provide device identifier 640 (e.g., the MDN) of UE 210 to carrier provisioning device 240 based on the receipt of indication 630. Carrier provisioning device 240 may receive device identifier 640, and may enable UE 210 to be provisioned in carrier network 250, based on device identifier 640, by providing provisioning information 650 to carrier network 250. Once UE 210 is provisioned for carrier network 250, the user may cause UE 210 to connect to carrier network 250. In one example, the user may power UE 210 on and off so that UE 210 connects to carrier network 250. Once UE 210 is connected to carrier network 250, UE 210 may perform various communication operations via carrier network 250.

Process block 1370 may include the process blocks depicted in FIG. 14. As shown in FIG. 14, process block 1370 may include one or more of receiving an inbound call from another UE via the particular carrier (block 1400), providing an outbound call to the other UE via the particular carrier (block 1410), exchanging messages with the other UE via the particular carrier (block 1420), and receiving content from a content device via the particular carrier (block 1430). For example, in an implementation described above in connection with FIG. 9, once the first UE 210 is connected to carrier network 250, the first UE 210 may perform various communication operations via carrier network 250. In one example, the first UE 210 may place outbound call 910 to a second UE 210, or may receive inbound call 920 from the second UE 210, via carrier network 250. Alternatively, or additionally, the first UE 210 may exchange SMS messages 930 with the second UE 210 via carrier network 250. Alternatively, or additionally, the first UE 210 may exchange content 940 (e.g., applications, data, audio, video, etc.) with server device 260 via carrier network 250.

Figure 15:
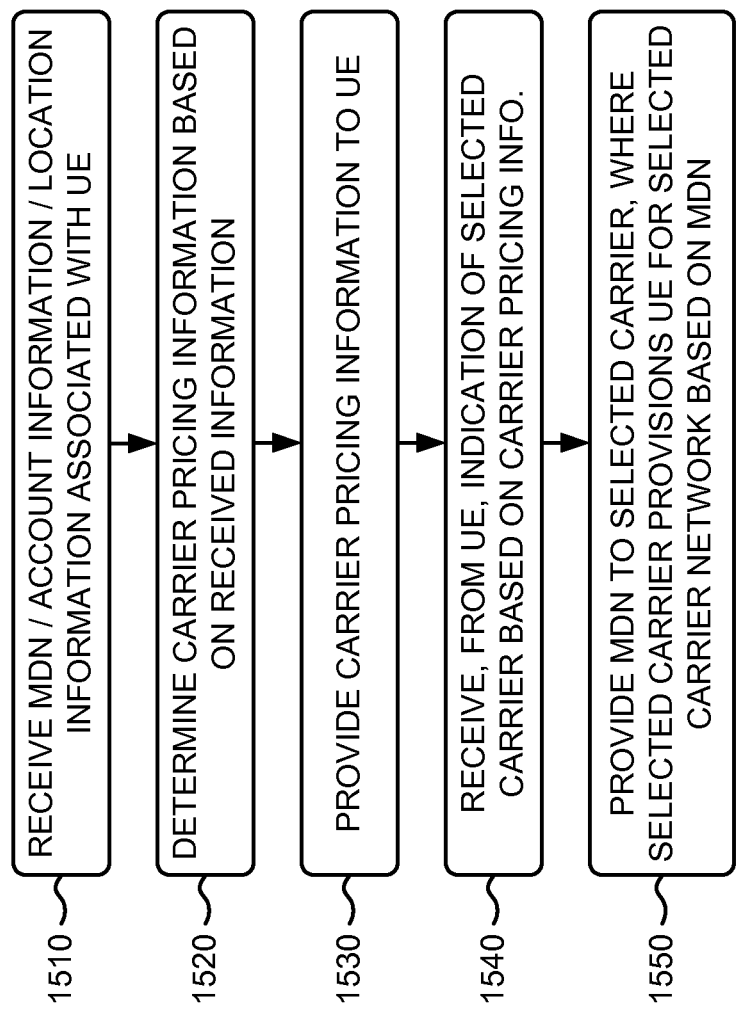
FIG. 15 is a flow chart of another example process for multicarrier wireless service selection.

FIG. 15 is a flow chart of another example process 1500 for multicarrier wireless service selection. In one implementation, process 1500 may be performed by carrier selection device 220. Alternatively, or additionally, some or all of process 1200 may be performed by another device or group of devices, including or excluding carrier selection device 220.

As shown in FIG. 15, process 1500 may include receiving a MDN, account information, and location information associated a UE (block 1510), and determining carrier pricing information based on the received information (block 1520). For example, in an implementation described above in connection with FIG. 6, carrier selection device 220 may receive the device identifier, the account information, and the location information from UE 210, and may determine carrier pricing information 620 (e.g., different carrier prices) based on the device identifier, the account information, and/or the location information. In one example, carrier selection device 220 may determine different carrier prices for UE 210 based on the location of UE 210 (e.g., a carrier located closer to UE 210 may provide better prices than a carrier located further away from UE 210). Alternatively, or additionally, carrier selection device 220 may determine different carrier prices for UE 210 based on the account information (e.g., a particular carrier may provide better prices for UE 210 since UE 210 may be prepaid for a particular plan, such as a 4G wireless plan provided by the particular carrier).

As further shown in FIG. 15, process 1500 may include providing the carrier pricing information to the UE (block 1530), and receiving, from the UE, an indication of a selected carrier based on the carrier pricing information (block 1540). For example, in an implementation described above in connection with FIG. 6, carrier selection device 220 may provide carrier pricing information 620 to UE 210. UE 210 may receive carrier pricing information 620, and may display carrier pricing information 620 on a user interface associated with UE 210. In one example, the user interface may provide a list of carriers and prices associated with the carriers. The user interface may instruct the user to select a carrier from the list, and the user may select one of the carriers from the list (e.g., using a touch screen display of UE 210). Based on the selection of the one carrier, UE may provide indication 630 of the selected carrier to carrier selection device 220, and carrier selection device 220 may receive indication 630 of the selected carrier.

Returning to FIG. 15, process 1500 may include providing the MDN to the selected carrier, where the carrier provisions the UE for a selected carrier network based on the MDN (block 1550). For example, in an implementation described above in connection with FIG. 6, carrier selection device 220 and may provide device identifier 640 (e.g., the MDN) of UE 210 to carrier provisioning device 240 based on the receipt of indication 630. In one example, carrier provisioning device 240 and carrier network 250 may be associated with the selected carrier. Carrier provisioning device 240 may receive device identifier 640, and may enable UE 210 to be provisioned in carrier network 250, based on device identifier 640, by providing provisioning information 650 to carrier network 250.

Systems and/or methods described herein may enable a prepaid UE to select a wireless carrier from a list of wireless carriers that includes prices associated with the wireless carriers. The prepaid UE may pay the selected wireless carrier at the time of selection and may utilize wireless services provided by the selected wireless carrier.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 13-15, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by a device and during a carrier selection session, billing information from a user;
providing, by the device and to a server device during the carrier selection session, the received billing information, a device identifier, and location information of the device,
the received billing information, the device identifier, and the location information being provided at substantially a same time;
receiving, by the device and during the carrier selection session and after providing the received billing information, the device identifier, and the location information to the server device, carrier pricing information from the server device,
the carrier pricing information being based on the device identifier, the location information, and the received billing information, and
the carrier pricing information being associated with a plurality of types of communication operations;
providing, by the device, the carrier pricing information for display,
the carrier pricing information including carrier pricing information for a plurality of carriers and for the plurality of types of communication operations;
receiving, by the device, a selection of a first particular carrier, of the plurality of carriers, from the displayed carrier pricing information for a first type of communication operation of the plurality of types of communication operations;
receiving, by the device, a selection of a second particular carrier, of the plurality of carriers, from the displayed carrier pricing information for a second type of communication operation of the plurality of types of communication operations,
the second particular carrier being different than the first particular carrier, and
the second type of communication operation being different than the first type of communication operation;
providing, by the device and based on the selection of the first particular carrier and the selection of the second particular carrier, an indication of the first particular carrier and an indication of the second particular carrier to the server device;
initializing, by the device, a first connection with the first particular carrier and a second connection with the second particular carrier;
performing, by the device, the first type of communication operation via the first connection with the first particular carrier; and
performing, by the device, the second type of communication operation via the second connection with the second particular carrier.

2. The method of claim 1, where the device comprises a user equipment (UE).

3. The method of claim 1, further comprising:
providing, to the server device, account information associated with the device; and
receiving the carrier pricing information from the server device based on the device identifier, the account information, the location information, and the received billing information.

4. The method of claim 1, where the device identifier includes a mobile directory number (MDN) associated with the device.

5. The method of claim 1, where the carrier pricing information includes a list of the plurality of carriers and prices for services provided by the plurality of carriers.

6. The method of claim 1, further comprising:
receiving additional selections of additional carriers, of the plurality of carriers, from the displayed carrier pricing information, the additional carriers providing one or more different services; and
providing, based on the additional selections, additional indications of the additional carriers to the server device.

7. The method of claim 1, where the plurality of types of communication operations include at least two of:
receiving an inbound call from another device via the first connection with the first particular carrier,
providing an outbound call to the other device via the first connection with the first particular carrier,
exchanging messages with the other device via the first connection with the first particular carrier, or
receiving content from a content device via the first connection with the first particular carrier.

8. A device comprising:
a processor to:
receive, during a carrier selection session, billing information from a user;
provide, during the carrier selection session and to a server device, the received billing information, a device identifier, and location information of the device,
the received billing information, the device identifier, and the location information being provided at substantially a same time;
receive, during the carrier selection session and after providing the received billing information, the device identifier, and the location information to the server device, carrier pricing information from the server device,
the carrier pricing information being based on the device identifier, the location information, and the received billing information, and
the carrier pricing information being associated with a plurality of types of communication operations;
provide the carrier pricing information for display,
the carrier pricing information including carrier pricing information for a plurality of carriers and for the plurality of types of communication operations;
receive a selection of a first particular carrier, of the plurality of carriers, from the displayed carrier pricing information for a first type of communication operation of the plurality of types of communication operations;
receive a selection of a second particular carrier, of the plurality of carriers, from the displayed carrier pricing information for a second type of communication operation of the plurality of types of communication operations,
the second particular carrier being different than the first particular carrier, and
the second type of communication operation being different than the first type of communication operation;

provide, based on the selection of the first particular carrier and the selection of the second particular carrier, an indication of the first particular carrier and an indication of the second particular carrier to the server device;

initialize a first connection with the first particular carrier and a second connection with the second particular carrier;

perform the first type of communication operation via the first connection with the first particular carrier; and perform the second type of communication operation via the second connection with the second particular carrier.

9. The device of claim 8, where the processor is further to:
provide, to the server device, account information associated with the device; and
receive the carrier pricing information from the server device based on the device identifier, the account information, the location information, and the received billing information.

10. The device of claim 8, where the device identifier includes a mobile directory number (MDN) associated with the device.

11. The device of claim 8, where the carrier pricing information includes a list of the plurality of carriers and prices for services provided by the plurality of carriers.

12. The device of claim 8, where the processor is further to:
receive additional selections of additional carriers, of the plurality of carriers, from the displayed carrier pricing information, the additional carriers providing one or more different services; and
provide, based on the additional selections, additional indications of the additional carriers to the server device.

13. The device of claim 8, where the plurality of types of communication operations include at least two of:
receiving an inbound call from another device via the first connection with the first particular carrier,
providing an outbound call to the other device via the first connection with the first particular carrier,
exchanging messages with the other device via the first connection with the first particular carrier, or
receiving content from a content device via the first connection with the first particular carrier.

14. A method comprising:
receiving, by a device and during a carrier selection session and at substantially a same time, billing information, an identifier associated with a user equipment (UE), and location information of the UE,
the billing information being provided by a user of the UE;
determining, by the device and during the carrier selection session and after receiving the billing information, the identifier associated with the UE, and the location information, carrier pricing information,
the carrier pricing information being based on the identifier associated with the UE, the location information, and the billing information, and
the carrier pricing information being associated with a plurality of types of communication operations;
providing, by the device, the carrier pricing information to the UE,
the carrier pricing information including carrier pricing information for a plurality of carriers and for the plurality of types of communication operations;
receiving, by the device and from the UE, an indication of a selected first carrier, of the plurality of carriers, for a first type of communication operation of the plurality of types of communication operations;
receiving, by the device and from the UE, an indication of a selected second carrier, of the plurality of carriers, for a second type of communication operation of the plurality of types of communication operations,
the selected second carrier being different than the selected first carrier, and
the second type of communication operation being different than the first type of communication operation;
providing, by the device and based on the indication of the selected first carrier, the identifier to the selected first carrier,
the identifier being used by the selected first carrier to provision the UE for a network associated with the selected first carrier; and
providing, by the device and based on the indication of the selected second carrier, the identifier to the selected second carrier,
the identifier being used by the selected second carrier to provision the UE for a network associated with the selected second carrier.

15. The method of claim 14, further comprising:
receiving account information associated with the UE; and
determining the carrier pricing information based on the identifier, the account information, the location information, and the billing information.

16. The method of claim 14, where the identifier includes a mobile directory number (MDN) associated with the UE.

17. The method of claim 14, where the carrier pricing information includes a list of the plurality of carriers and prices for services provided by the plurality of carriers.

18. A device comprising:
a processor to:
receive, during a carrier selection session and at substantially a same time, billing information, an identifier associated with a user equipment (UE), and location information of the UE,
the billing information being provided by a user of the UE;
determine, during the carrier selection session and after receiving the billing information, the identifier associated with the UE, and the location information, carrier pricing information,
the carrier pricing information being based on the identifier associated with the UE, the location information, and the billing information, and
the carrier pricing information being associated with a plurality of types of communication operations;
provide the carrier pricing information to the UE,
the carrier pricing information including carrier pricing information for a plurality of carriers and for the plurality of types of communication operations;
receive, from the UE, an indication of a selected first carrier, of the plurality of carriers, based on the carrier pricing information and for a first type of communication operation of the plurality of types of communication operations;
receive, from the UE, an indication of a selected second carrier, of the plurality of carriers, based on the carrier pricing information and for a second type of communication operation of the plurality of types of communication operations,
the selected second carrier being different than the selected first carrier, and
the second type of communication operation being different than the first type of communication operation;

provide, based on the indication of the selected first carrier, the identifier to the selected first carrier,
the identifier being used by the selected first carrier to provision the UE for a network associated with the selected first carrier; and
provide, based on the indication of the selected second carrier, the identifier to the selected second carrier,
the identifier being used by the selected second carrier to provision the UE for a network associated with the selected second carrier.

19. The device of claim 18, where the processor is further to:
receive account information associated with the UE; and
determine the carrier pricing information based on the identifier, the account information, the location information, and the billing information.

20. The device of claim 18, where the identifier includes a mobile directory number (MDN) associated with the UE.

21. The device of claim 18, where the carrier pricing information includes a list of the plurality of carriers and prices for services provided by the plurality of carriers.

* * * * *